(12) United States Patent
Wong et al.

(10) Patent No.: US 10,613,646 B2
(45) Date of Patent: Apr. 7, 2020

(54) STYLUS PEN

(71) Applicant: ASUSTeK COMPUTER INC., Taipei (TW)

(72) Inventors: Wei-Ting Wong, Taipei (TW); Ching-Fu Hsu, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 16/003,212

(22) Filed: Jun. 8, 2018

(65) Prior Publication Data

US 2018/0364820 A1 Dec. 20, 2018

(30) Foreign Application Priority Data

Jun. 16, 2017 (TW) .............................. 106120242 A

(51) Int. Cl.
*G06F 3/0354* (2013.01)
*G06F 3/038* (2013.01)
*G06F 3/044* (2006.01)

(52) U.S. Cl.
CPC ........ *G06F 3/03545* (2013.01); *G06F 3/0383* (2013.01); *G06F 3/044* (2013.01); *G06F 3/0442* (2019.05)

(58) Field of Classification Search
None
See application file for complete search history.

(56) References Cited

U.S. PATENT DOCUMENTS

| 8,928,635 | B2 | 1/2015 | Harley et al. |
| 2012/0146960 | A1 | 6/2012 | Shih et al. |
| 2015/0286309 | A1* | 10/2015 | Chang ................. G06F 3/03545 345/174 |
| 2017/0242501 | A1* | 8/2017 | Tang ................... G06F 3/03545 |
| 2017/0371437 | A1 | 12/2017 | Lin et al. |

FOREIGN PATENT DOCUMENTS

| CN | 203799342 U | 8/2014 |
| CN | 103353304 B | 2/2016 |
| TW | M406215 U1 | 6/2011 |
| TW | M432881 U1 | 7/2012 |
| TW | 201530362 A | 8/2015 |
| TW | M530986 U | 10/2016 |

* cited by examiner

*Primary Examiner* — Stephen T. Reed
(74) *Attorney, Agent, or Firm* — McClure, Qualey & Rodack, LLP

(57) ABSTRACT

A stylus pen includes a body, a conductive element, and a cap. The conductive element is disposed at one end of the body and has at least one through hole. The cap embedded in the through hole covers a portion of the conductive element away from the body. The stylus pen simulates the writing experience of a general pen. In addition, the abrasion of the stylus pen caused by long time writing can also be reduced. Moreover, the conductive portion inside the active stylus pen can be located closer to the touch panel.

9 Claims, 8 Drawing Sheets

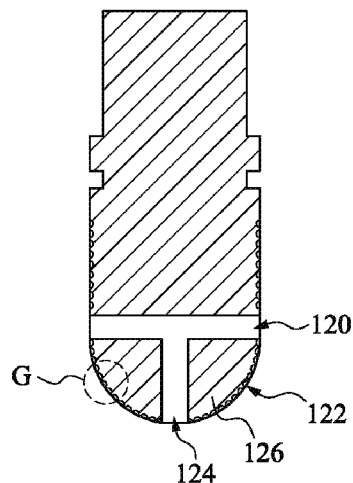
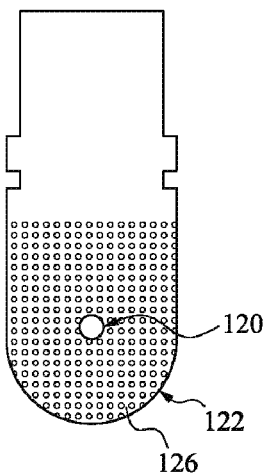
FIG. 3A　　　　　　FIG. 3B
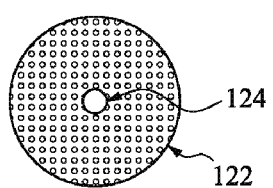
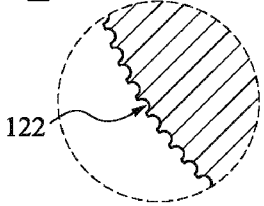
FIG. 3C　　　　　　FIG. 3D

STYLUS PEN

CROSS-REFERENCE TO RELATED APPLICATION

This application claims the priority benefit of Taiwan application serial No. 106120242, filed on Jun. 16, 2017. The entirety of the above-mentioned patent application is hereby incorporated by reference herein and made a part of specification.

BACKGROUND OF THE INVENTION

Field of the Invention

The disclosure relates to a stylus pen.

Description of the Related Art

With the rapid development of technology, most electronic devices, such as tablet PCs, smartphones, or notebook computers, are equipped with touch panels as an input interface. A stylus pen is urilized by approaches or touches a capacitive touch panel to change its capacitance value, and executes the corresponding function.

However, a stylus pen does not provide users a tactile impression similar to that of a common pen. Further, the stylus pen might be damaged when users use it improperly. In addition, when the general stylus pen is operated on the panel, various tactile impressions might be generated from the stylus pen since the smoothness of a contact surface of the panel is various.

BRIEF SUMMARY OF THE INVENTION

According to an aspect of the disclosure, a stylus pen is provided herein. The stylus pen comprising: a body; a conductive element disposed at one end of the body and having at least one through hole; and a cap covering a portion of the conductive element away from the body and embedded in the through hole.

In the foregoing configuration, the stylus pen simulates the writing experience of a general pen (such as a pencil or a ballpoint pen). In addition, the abrasion of the stylus pen caused by long time writing can also be reduced. Moreover, the conductive portion (that is, the conductive element of the present disclosure) inside the active stylus pen can be located closer to the touch panel. A better and more accurate sensing position of the stylus pen during writing on the panel is achieved.

BRIEF DESCRIPTION OF THE DRAWINGS

FIG. 3A to FIG. 3C respectively show a cross-sectional view, a side view, and a bottom view of a conductive element according to an embodiment.

FIG. 3D is an enlarged schematic view of a part of FIG. 3A.

DETAILED DESCRIPTION OF THE EMBODIMENTS

Figure 1:
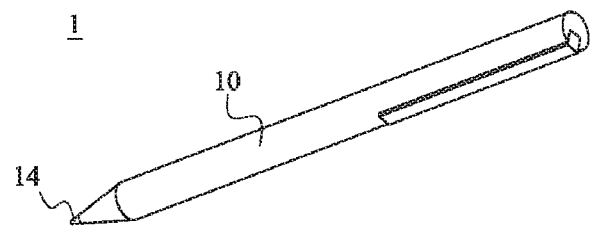
FIG. 1 illustrates a perspective view of a stylus pen according to an embodiment.
Figure 2:
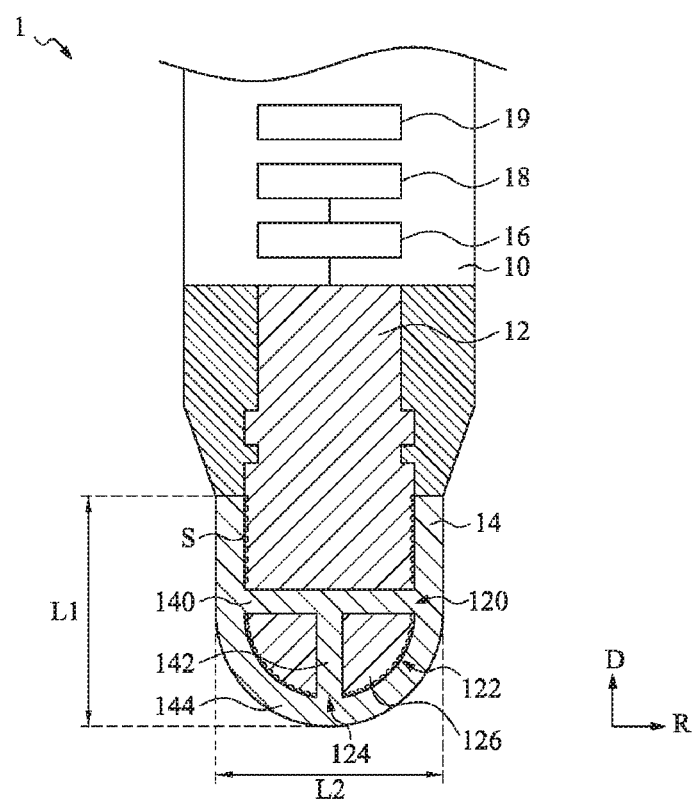
FIG. 2 shows a partial cross-sectional view of a stylus pen according to an embodiment.

Please refer to FIG. 1 and FIG. 2. FIG. 1 shows a perspective view of a stylus pen 1 according to an embodiment. FIG. 2 shows a partial structural cross-sectional view of a stylus pen 1 according to an embodiment. As shown in the figures, a stylus pen 1 includes a body 10, a conductive element 12, a cap 14, a driving circuit 16, a power source 18, and a direction sensor 19.

Please refer to FIG. 3A to FIG. 3D. FIG. 3A to FIG. 3C respectively show a cross-sectional view, a side view, and a bottom view of the conductive element 12 according to an embodiment. FIG. 3D is an enlarged schematic view of part G in FIG. 3A. As shown in the figures, the conductive element 12 of the stylus pen 1 is disposed at one end of the body 10 (shown in FIG. 2) and has at least one through hole 120 (such as one as shown) and at least one opening 124 (such as one as shown) and a joint surface 122 (shown in FIG. 3D). In an embodiment, the joint surface 122 is a rough surface or a surface with multiple grooves. The opening 124 of the conductive element 12 is disposed at a portion 126 (shown in FIG. 2) of the conductive element 12 away from the body 10, and connected to the through hole 120 of the conductive element 12. The joint surface 122 is provided at the portion 126 of the conductive element 12. In this embodiment, the joint surface 122 is illustrated as a surface having a plurality of circular grooves. In other embodiments, the joint surface 122 is in any suitable form.

In one embodiment, the material of the conductive element 12 is polyoxymethylene (POM).

Figure 4A:
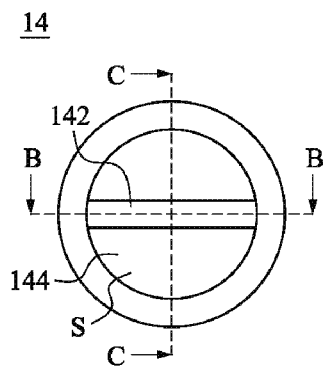
FIG. 4A shows a top view of a cap according to an embodiment.
Figure 4B:
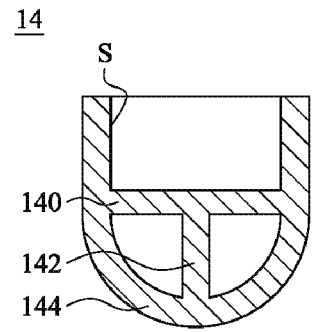
FIG. 4B and FIG. 4C show a cross-sectional view along line B-B and line C-C in FIG. 4A respectively.
Figure 4C:
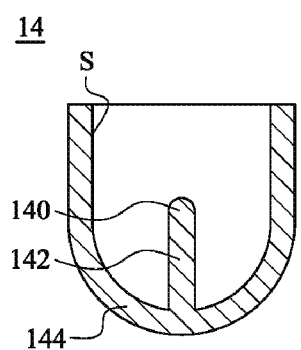
Figure 4D:
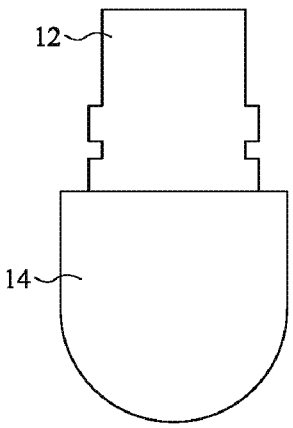
FIG. 4D is a side view of a conductive element and a cap according to an embodiment.

Please refer to FIG. 2 and FIG. 4A to FIG. 4D. FIG. 4A illustrates a top view of the cap 14 according to an embodiment. FIG. 4B and FIG. 4C respectively show cross-sectional views along line B-B and line C-C in FIG. 4A. FIG. 4D is a side view of the conductive element 12 and the cap 14 according to an embodiment. As shown in the figures, the cap 14 of the stylus pen 1 is configured to cover the portion 126 of the conductive element 12 (shown in FIG. 2), embedded in the through hole 120 of the conductive element 12, and fixed with the conductive element 12 through the joint surface 122. In one embodiment, the shape of the cap 14 is similar to the shape of the conductive element 12. The cap 14 includes at least one first embedded portion 140 (such as one as shown), at least one second embedded portion 142

(such as one as shown), and a cover portion 144. Both ends of the first embedded portion 140 of the cap 14 connect to the inner surface S of the cover portion 144 and pass through the through hole 120 of the conductive element 12. The second embedded portion 142 of the cap 14 extends from the inner surface S of the cover portion 144, passes through the opening 124 of the conductive element 12, and connects to the first embedded portion 140.

In FIG. 2, the cap 14 of the stylus pen 1 has a first length L1 in an axial direction D and a second length L2 in a radial direction R. The second length L2 may be equal to or not equal to the first length L1. In an embodiment, each of the first length L1 and the second length L2 is in a range from about 0.5 mm to about 1.5 mm. The radial direction R of the cap 14 is substantially perpendicular to the axial direction D of the cap 14. The thickness of the cover portion 144 of the cap 14 in a direction perpendicular to the surface of the conductive element 12 is in a range from about 0.2 mm to about 0.5 mm.

In some embodiments, the conductive element 12 is manufactured by injection molding. The through hole 120 and the opening 124 are formed in the conductive element 12 by drilling (such as Computer Numerical Control process, CNC process). Then, the cap 14 covers the conductive element 12 by injection molding, and fills the through hole 120 and the opening 124 of the conductive element 12 to form the stylus pen 1. However, the manufacturing method of the stylus pen 1 is not limited to the foregoing, and any suitable process can be applied to the disclosure.

In the embodiment, the material of the cap 14 is thermoplastic polyurethane (TPU). In some embodiments, the cap 14 is a conductive material or a non-conductive material.

In this way, the cap 14 of the present embodiment makes the stylus pen 1 provide a better writing feeling when the stylus pen 1 is used by an user, and improves the abrasion resistance of the stylus pen 1. In addition, the cap 14 can be firmly bonded to the conductive element 12 by the first embedded portion 140 and the second embedded portion 142 of the cap 14 being respectively embedded in the through hole 120 and the opening 124 of the conductive element 12. Through the foregoing structural configuration, relative movement between the cap 14 and the conductive element 12 during using the stylus pen 1 can be avoided to improve the structural stability of the stylus pen 1, reduce the loss of the stylus pen 1 and increase the service life. In addition, the cap 14 of the stylus pen 1 further includes a joint surface 122. The joint surface 122 and the cap 14 are fixed to each other, so that the bonding strength between the cap 14 and the conductive element 12 can be increased to improve the stability of the overall structure of the stylus pen 1.

Figure 5:
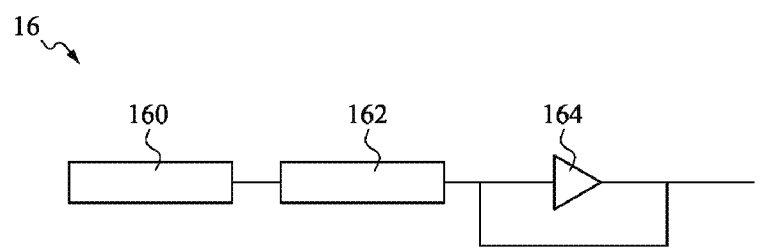
FIG. 5 is a schematic diagram of a driving circuit according to an embodiment.

Please refer to FIG. 2 and FIG. 5. FIG. 5 shows a schematic diagram of a driving circuit 16 according to an embodiment. As shown in FIG. 2, the driving circuit 16 is disposed in the body 10, electrically connected to the conductive element 12, and connected to a power source 18 (for example, a battery provided in the stylus pen 1) to receive power. In other embodiments, the driving circuit 16 of the stylus pen 1 is connected with the cable of other electronic device or inductively coupled with the other electronic device (for example, the touch panel 2 shown in FIG. 6A) to use power of the connected or inductively coupled electronic device. The driving circuit 16 of this embodiment generates a driving signal to drive the conductive element 12 to output a signal actively through.

In FIG. 5, the driving circuit 16 includes a timer 160 (such as a clock generation circuit), a microcontroller 162, and a signal amplifier 164. The timer 160 provides the driving signal. The microcontroller 162 controls the driving signal generated by the timer 160, and the signal amplifier 164 is used to amplify the gain of the driving signal to the conductive element 12.

Figure 6A:
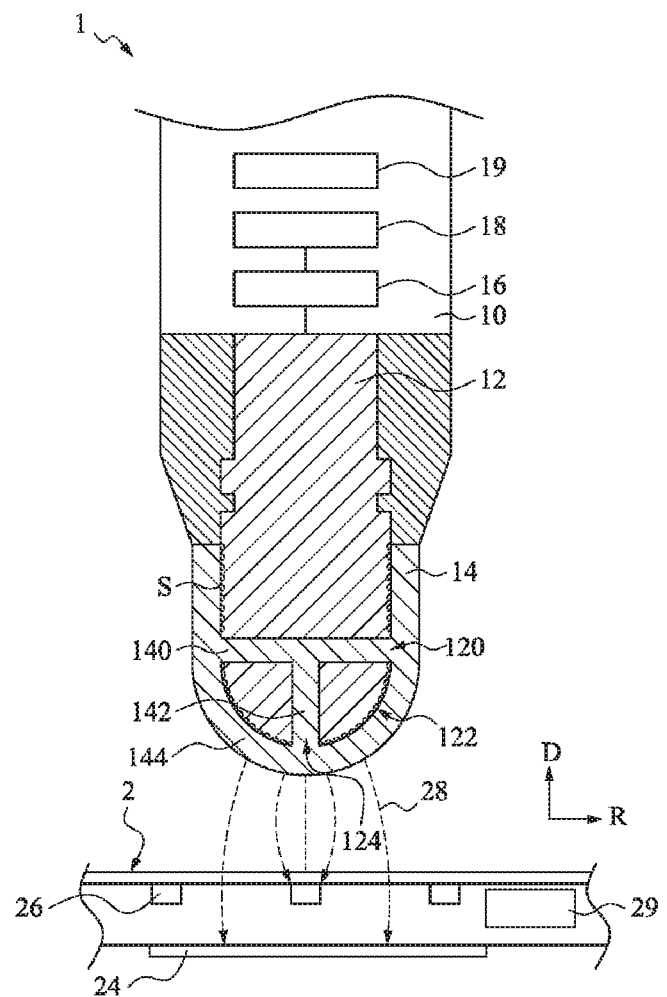
FIG. 6A is a cross-sectional view of a stylus pen and a touch panel according to an embodiment, wherein the axial direction of the stylus pen is substantially perpendicular to a surface of the touch panel.
Figure 6B:
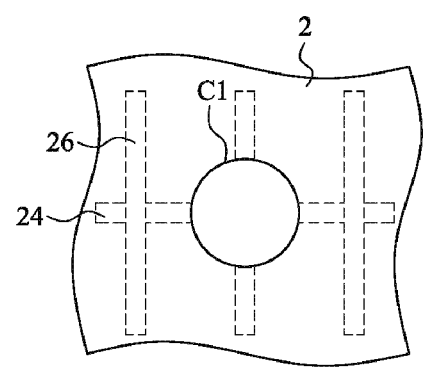
FIG. 6B illustrates a maximum electric field position defined by the stylus pen on the touch panel and the top view of the touch panel in FIG. 6A.

Please refer to FIGS. 6A and 6B. FIG. 6A illustrates a cross-sectional view of a stylus pen 1 and a touch panel 2 according to an embodiment. FIG. 6B illustrates a top view of the maximum electric field position C1 and the touch panel 2 defined on the touch panel 2 in the stylus pen 1 in FIG. 6A. As shown in the figures, in the embodiment, the axial direction D of the cap 14 of the stylus pen 1 is substantially perpendicular to the surface of the touch panel 2. The touch panel 2 includes a plurality of row sensing electrodes 24 and a plurality of column sensing electrodes 26. When the stylus pen 1 approaches the sensible range of the touch panel 2 or actually touches the touch panel 2, the touch panel 2 senses the charge excited by the stylus pen 1 and coupled to the row sensing electrodes 24 and the column sensing electrodes 26, to determine the position of the stylus pen 1 on the surface of the touch panel 2.

In FIG. 6A, when the cap 14 of the stylus pen 1 is in contact with (or in close proximity to) the touch panel 2, the conductive element 12 of the stylus pen 1 is excited to generate an electric field line 28 and capacitive coupling with the row sensing electrodes 24 and/or the column sensing electrodes 26 of the touch panel to form a capacitive path between the stylus pen 1 and the touch panel 2. Therefore, the charge from the stylus pen 1 is coupled to the row sensing electrodes 24 and the column sensing electrodes 26. Each of the row sensing electrodes 24 and the column sensing electrodes 26 respectively transmit the charge-coupled signals (capacitance values) to a processing unit (not shown) of the touch panel 2. The processing unit determines the position touched by the stylus pen 1 on the touch panel 2 according to the row and column of the received signal.

In FIG. 6B, when the stylus pen 1 is in contact with (or approaching) the touch panel 2, A capacitance is formed between the conductive element 12 and adjacent conductive elements (such as the row sensing electrodes 24 and/or the column sensing electrodes 26) in the touch panel 2. Meanwhile the touch panel 2 has a maximum electric field position C1 on which the conductive element 12 is sensed. In addition, since the stylus pen 1 is perpendicular to the touch panel 2, the vertical projection of the conductive element 12 on the touch panel 2 is circular, and the maximum electric field position C1 on the touch panel 2 can be displayed as a circle. At this time, the maximum electric field position C1 overlaps with the contact position of the stylus pen 1 on the touch panel 2, and related information is displayed on the touch position of the stylus pen 1 on the touch panel 2.

Figure 7:
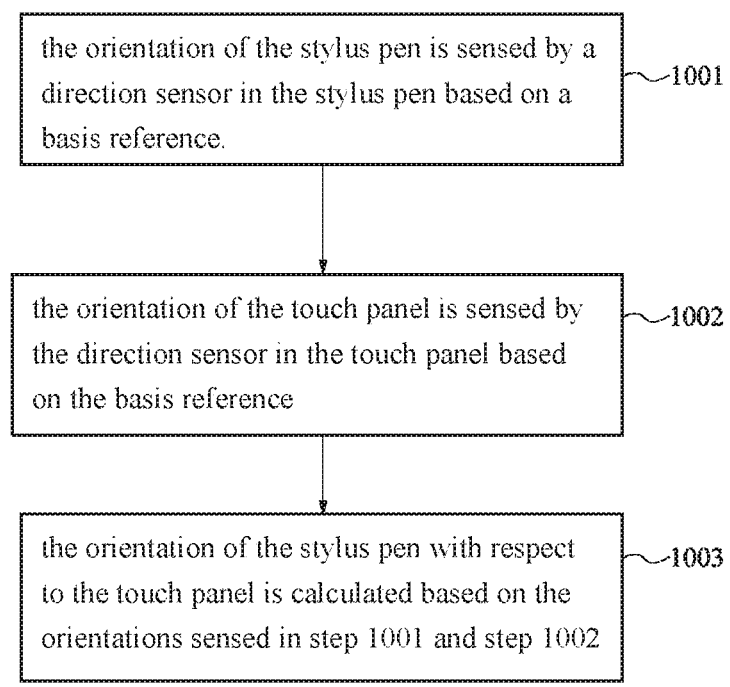
FIG. 7 is a flowchart of a method of sensing the orientation of a stylus pen with respect to a touch panel according to an embodiment.

Please refer to FIG. 7. FIG. 7 is a flowchart of a method of sensing the orientation of the stylus pen 1 with respect to the touch panel 2 according to an embodiment. Although the method disclosed herein have been illustrated and described as a series of steps or events, it should be noted that the illustrated ordering of such steps or events are not to be interpreted in a limited meaning. For example, some steps may occur in different orders and/or concurrently with other steps or events in addition to the order illustrated and/or described herein. In addition, implementing one or more aspects or embodiments described herein may not all depict operation. Furthermore, one or more of the steps described herein may be implemented in one or more separate steps and/or stages. Specifically, the method for sensing the orientation of the stylus pen 1 with respect to the touch panel 2 includes step 1001 to step 1003.

In step 1001, the orientation of the stylus pen 1 is sensed by a direction sensor 19 in the stylus pen 1 based on a basis reference. For example, the direction sensor 19 includes an accelerometer, a gyroscope, or a magnetometer, which is not limited herein.

In step 1002, the orientation of the touch panel 2 is sensed by the direction sensor 29 in the touch panel 2 based on the basis reference. For example, the direction sensor 29 includes an accelerometer, a gyroscope, or a magnetometer, which is not limited herein.

In step 1003, the orientation of the stylus pen 1 with respect to the touch panel 2 is calculated based on the orientations sensed in step 1001 and step 1002. Specifically, the foregoing calculation includes that the stylus pen 1 transmits the signal from the direction sensor 19 to a processing unit (not shown) through wired or wireless communication and the touch panel 2 transmits the signal from the direction sensor 29 to the processing unit. Then, the processing unit figures out the orientation of the stylus pen 1 relative to the touch panel 2 based on the orientations sensed by the two direction sensors 19 and 29. In some embodiments, the processing unit may be disposed in the touch panel 2. In an embodiment, the processing unit is disposed on the stylus pen 1, and the touch panel 2 transmits the signal from the direction sensor 29 to the stylus pen 1, and then the stylus pen 1 figures out the orientation of the stylus pen 1 relative to the touch panel 2 and transmits the orientation back to touch panel 2

Figure 8A:
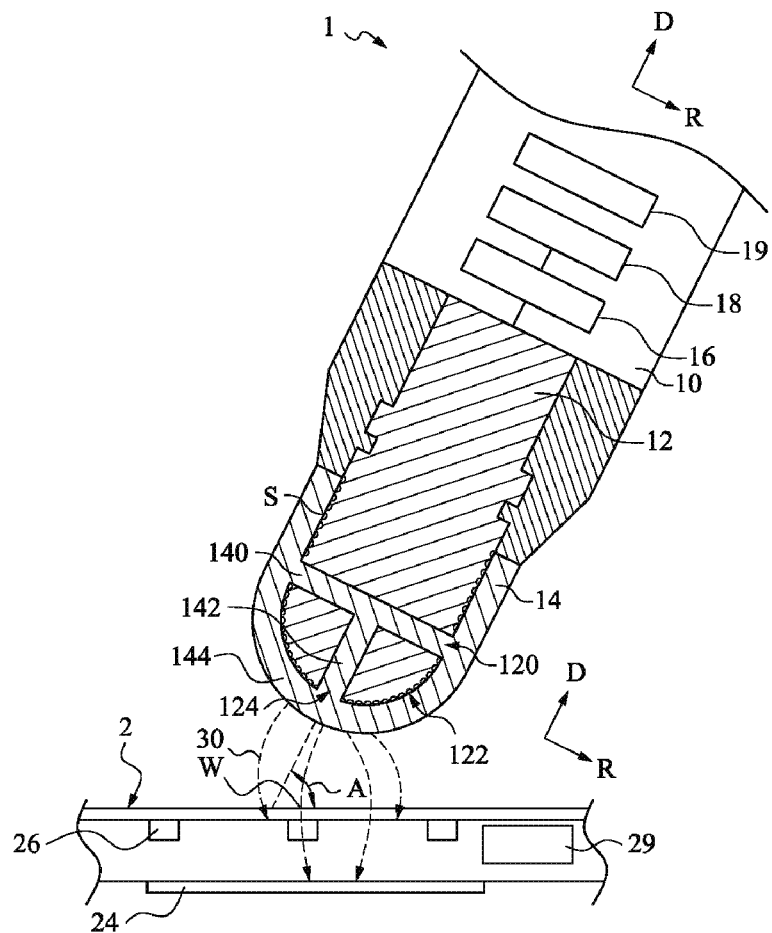
FIG. 8A is a cross-sectional view of a stylus pen and a touch panel according to an embodiment, wherein the axial direction of the stylus pen is at an angle to the surface of the touch panel.
Figure 8B:
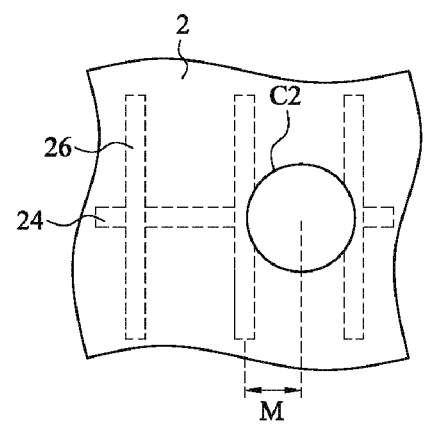
FIG. 8B is a top view of the maximum electric field position defined on the touch panel and the top view of the touch panel in FIG. 8A.

Please refer to FIG. 8A and FIG. 8B. FIG. 8A is a cross-sectional view of a stylus pen 1 and a touch panel 2 according to an embodiment. FIG. 8B is a top view of the virtual contact image of the maximum electric field position C2 defined on the touch panel 2 by the stylus pen 1 and the top view of the touch panel in FIG. 8A. As shown in the figures, in the embodiment, there is an angle A between the axial direction D of the cap 14 of the stylus pen 1 and the surface of the touch panel 2 are at, and the cap 14 is in contact with the intersection point W of the surface of the touch panel 2.

In FIG. 8A and FIG. 8B, when the stylus pen 1 touches the touch panel 2, the conductive element 12 of the stylus pen 1 is excited to generate an electric field line 30. Capacitance is formed between the conductive element 12 and conductive elements (such as row sense electrodes 24 and/or column sense electrodes 26) of the touch panel 2. At this time, the touch panel 2 has the maximum electric field position C2 on which the conductive element 12 is sensed (shown in FIG. 8B). In addition, since the cap 14 of the stylus pen 1 has a first length L1 and a second length L2 in the axial direction D and the radial direction R, respectively, and the second length L2 is substantially equal to the first length L1 (shown in FIG. 2). Therefore, the maximum electric field position C2 on the touch panel 2 is substantially displayed as a circle. Furthermore, since there is the angle A between the axial direction D of the cap 14 of the stylus pen 1 and the surface of the touch panel 2, and the distance between the touch panel 2 and the conductive element 12 is equal to or more than the thickness of the cap 14, the maximum electric field position C2 on the touch panel 2 deviates from the contact position W on which the cap 14 contacts the touch panel 2. That is, there is a compensation distance M between the center of the maximum electric field position C2 and the contact position W.

Therefore, since there is the angle A between the axial direction D of the cap 14 of the stylus pen 1 and the surface of the touch panel 2 and the distance between the touch panel 2 and the conductive element 12 is equal to or more than the thickness of the cap 14, the direction sensor 19 of the stylus pen 1, the direction sensor 29 of the touch panel 2 and a processing unit (not shown) cooperate to display relevant information on the contact position W of the touch panel 2 rather than on the maximum electric field position C2 of the touch panel 2.

Specifically, in this embodiment, the orientations of the stylus pen 1 relative to the touch panel 2 (such as an inclination angle and/or a tilt direction) are calculated by the direction sensor 19 of the stylus pen 1 and the orientation sensor 29 of the touch panel 2. The processing unit obtains a compensation distance M corresponding to the figured out orientation from a pre-set relationship between the orientation and compensation distance M (distance between the maximum electric field position C2 and the contact position W) according to the figured out orientation (such as angle A). Then, the processing unit feeds back the compensation distance M to the touch panel 2 to further figure out the contact position W of the touch panel 2 according to the maximum electric field position C2, and then displays the related information at the touch position W. For example, when the stylus pen 1 is tilted to the right, the maximum electric field position C2 is located at the right side of the contact position W, therefore, the compensation distance M is compensated to the left of the pixel (pixel) on the touch panel 2. In contrast, when the stylus pen 1 is tilted to the left, the maximum electric field position C2 is located at the left of the contact position W, therefore, the compensation distance M will be compensated to the right of the pixel (pixel) on the touch panel 2.

In practical applications, the relationship between the orientation (such as the tilt angle or the tilt direction of the stylus pen 1 relative to the touch panel 2) and the corresponding compensation distance M can be determined experimentally. The processing unit obtains the corresponding compensation distance M from the pre-set relationship diagram according to the actual relative orientation, and feeds back the compensation distance M to the touch panel 2 to calculate the contact position W of the touch panel 2, on which the stylus pen 1 contacts the touch panel 2. In some embodiments, the processing unit is disposed in the touch panel 2. In other embodiments, the processing unit is disposed in the stylus pen 1.

From the above detailed description of the specific embodiments of the present disclosure, it can be clearly seen that the cap of the stylus pen of the present embodiment makes the stylus pen 1 provide a better writing feeling when the stylus pen 1 is used by an user, and can improve wear resistance of the stylus pen. In addition, the cap can be firmly bonded to the conductive element by the first embedded portion and the second embedded portion of the cap respectively embedded in the through hole and the opening of the conductive element. Through the foregoing structural configuration, relative movement between the cap and the conductive element during use is avoided to improve the structural stability of the stylus pen and increase the service life of the stylus pen. Moreover, since there is the angle A between the axial direction of the body of the stylus pen and the surface of the touch panel and the distance between the touch panel and the conductive element is equal to or more than the thickness of the cap, the direction sensor of the stylus pen, the direction sensor of the touch panel and a processing unit cooperate to display relevant information on the contact position W on which the touch panel contact the touch panel rather than on the maximum electric field position of the touch panel.

Although the present invention has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. A stylus pen, comprising:
   a body extending along an axial direction;
   a conductive element, disposed at one end of the body and having at least one through hole extending along a radical direction substantially perpendicular to the axial direction; and
   a cap, comprising a cover portion wrapping a portion of the conductive element away from the body and comprising a first embedded portion passing through the through hole of the conductive element that extends along the radical direction substantially perpendicular to the axial direction.

2. The stylus pen according to claim 1, wherein a shape of the cap is similar to an shape of the conductive element.

3. The stylus pen according to claim 1, wherein the portion of the conductive element includes a plurality of joint surfaces and the cap is fixed to the conductive element through the joint surfaces.

4. The stylus pen according to claim 1, wherein the conductive element includes an opening disposed at the portion of the conductive element, and the opening is connected to the through hole.

5. The stylus pen according to claim 1, wherein the cap further includes at least one second embedded portion, both ends of the first embedded portion connect to an inner surface of the cover portion and pass through the through hole, and the second embedded portion extends from the inner surface of the cover portion and passes through the opening.

6. The stylus pen according to claim 5, wherein one end of the second embedded portion is connected to the inner surface of the cover portion and the other end is connected to the first embedded portion.

7. The stylus pen according to claim 1, wherein the material of the conductive element is polyoxymethylene.

8. The stylus pen according to claim 1, wherein the material of the cap is thermoplastic polyurethane.

9. The stylus pen according to claim 1, further comprising a driving circuit electrically connected to the conductive element.

* * * * *